US009899730B2

(12) United States Patent
Yang et al.

(10) Patent No.: US 9,899,730 B2
(45) Date of Patent: Feb. 20, 2018

(54) BROADBAND ANTENNA IN THE CRASH PAD FOR VEHICLE

(71) Applicants: Tae Hoon Yang, Gyeonnggi-do (KR); Sung Min Cho, Gyeonggi-do (KR); Sang A Ju, Gyeonggi-do (KR); Byeong Chan Yu, Gyeonggi-do (KR); Sang Hoon Lim, Gyeonggi-do (KR); Jin Kyu Hwang, Incheon (KR)

(72) Inventors: Tae Hoon Yang, Gyeonnggi-do (KR); Sung Min Cho, Gyeonggi-do (KR); Sang A Ju, Gyeonggi-do (KR); Byeong Chan Yu, Gyeonggi-do (KR); Sang Hoon Lim, Gyeonggi-do (KR); Jin Kyu Hwang, Incheon (KR)

(73) Assignee: INFAC ELECS CO., LTD. (KR)

( * ) Notice: Subject to any disclaimer, the term of this patent is extended or adjusted under 35 U.S.C. 154(b) by 0 days.

(21) Appl. No.: 15/600,239

(22) Filed: May 19, 2017

(65) Prior Publication Data
US 2017/0346174 A1    Nov. 30, 2017

(30) Foreign Application Priority Data

May 31, 2016    (KR) .................. 10-2016-0067483

(51) Int. Cl.
*H01Q 1/32*    (2006.01)
*H01Q 5/371*    (2015.01)
(Continued)

(52) U.S. Cl.
CPC ........... *H01Q 1/3291* (2013.01); *H01Q 5/371* (2015.01); *H04B 1/3827* (2013.01); *H04B 1/40* (2013.01); *H01Q 21/28* (2013.01); *H01Q 21/30* (2013.01)

(58) Field of Classification Search
CPC .................................................... H01C 1/3275
See application file for complete search history.

(56) References Cited

U.S. PATENT DOCUMENTS 3,731,202 A * 5/1973 Meyers .................. B60K 37/04
343/711
2011/0227795 A1* 9/2011 Lopez .................... H01Q 1/243
343/700 MS
(Continued)

FOREIGN PATENT DOCUMENTS

JP          3162787 U      8/2010
KR     10-2010-0092366 A   8/2010
(Continued)

*Primary Examiner* — Hsin-Chun Liao
(74) *Attorney, Agent, or Firm* — Tarolli, Sundheim, Covell & Tummino LLP

(57) ABSTRACT

Disclosed herein is a vehicle broadband antenna that is an antenna for LTE & V2X installed in the vicinity of a crash pad of a vehicle. The crash pad broadband antenna is installed in the vicinity of a vehicle crash pad and includes a main PCB, an LTE low-band antenna pattern formed on the main PCB to transmit and receive an LTE low-band signal, a first sub-PCB having LTE high-band antenna patterns configured to transmit and receive an LTE high-band signal, the first sub-PCB being vertically coupled to the main PCB, and a first terminal connected to an external communication module for transmitting and receiving the signals to/from the LTE low-band antenna pattern and the LTE high-band antenna patterns. It is possible to overcome existing spatial limitations by applying the broadband antenna to the vehicle, and to significantly reduce the time required to manufacture and develop an existing mold.

12 Claims, 7 Drawing Sheets

(51) Int. Cl.
*H04B 1/3827* (2015.01)
*H04B 1/40* (2015.01)
*H01Q 21/28* (2006.01)
*H01Q 21/30* (2006.01)

(56) References Cited

U.S. PATENT DOCUMENTS

2012/0081253 A1* 4/2012 Duzdar ................. H01Q 21/28
    343/713
2014/0292593 A1* 10/2014 Thiam .................. H01Q 1/3275
    343/713

FOREIGN PATENT DOCUMENTS

| KR | 10-2012-0100035 A | 9/2012 |
| KR | 10-2016-0036308 A | 4/2016 |

\* cited by examiner

[Fig. 1]
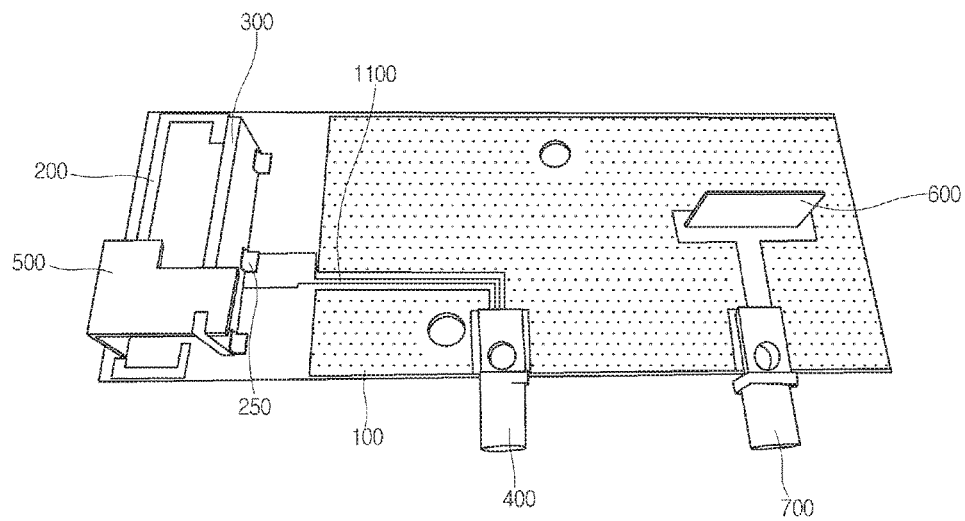
[Fig. 2]
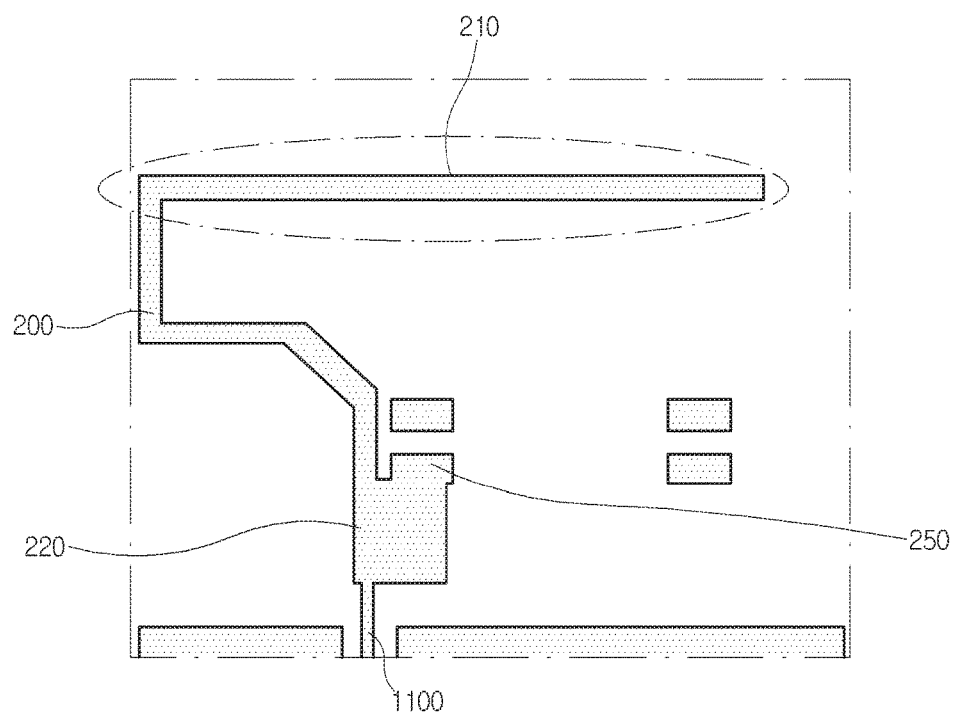

[Fig. 3]
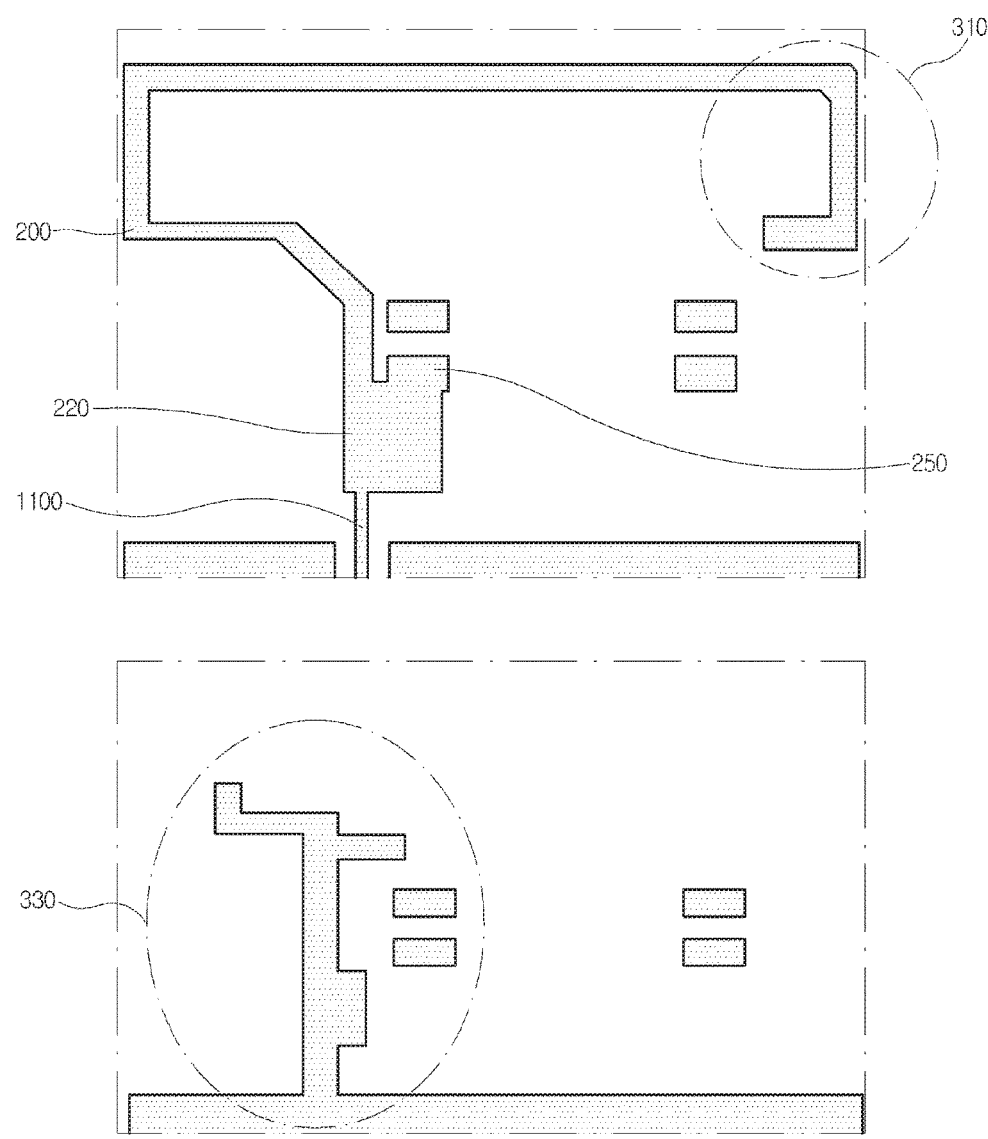

[Fig. 4]
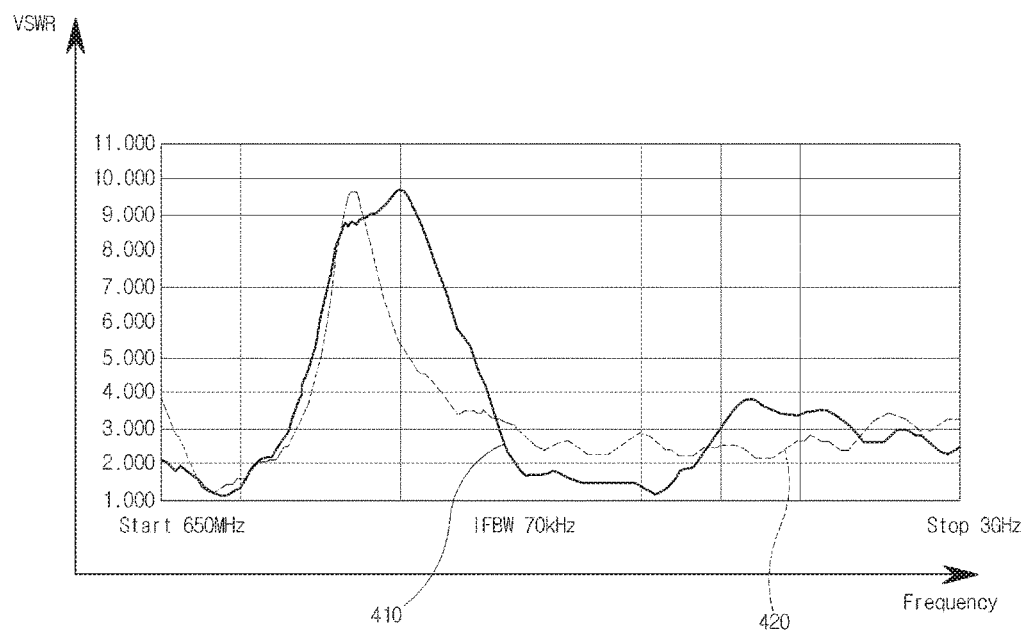
[Fig. 5]
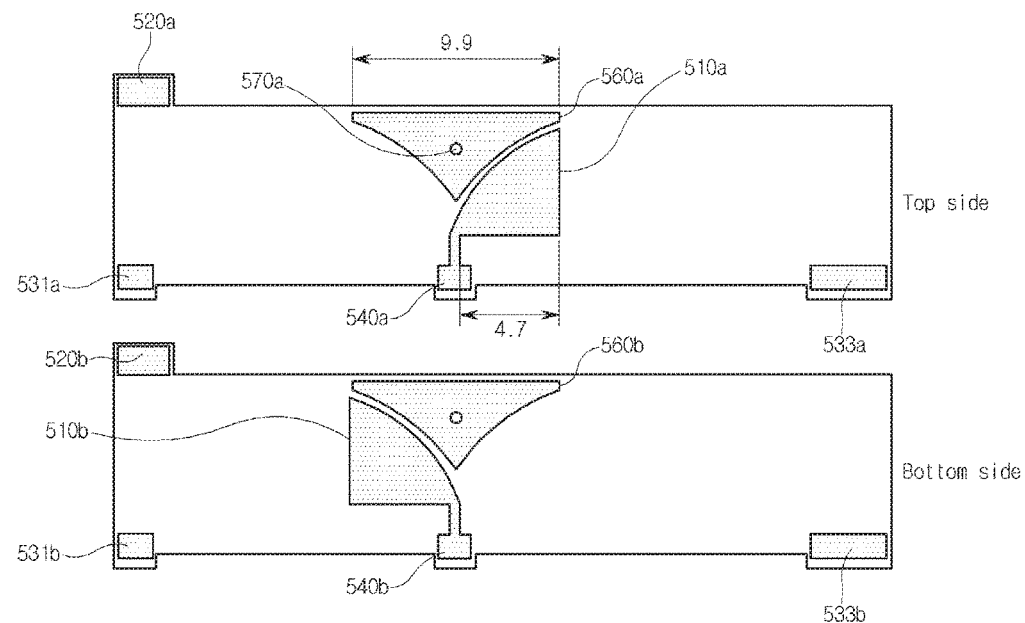

[Fig. 6]
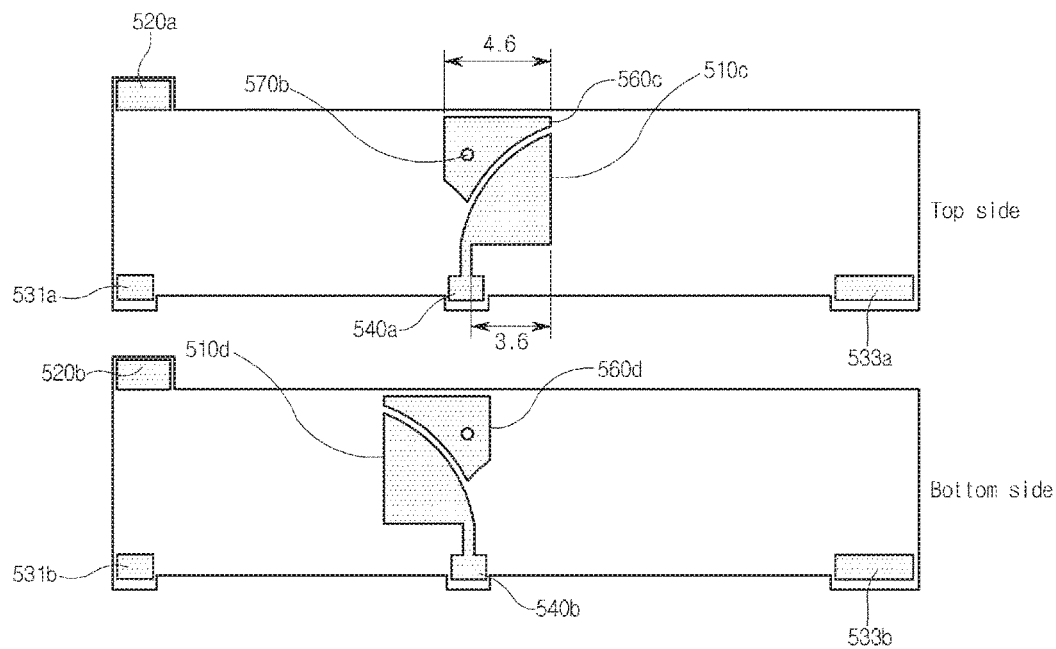
[Fig. 7]
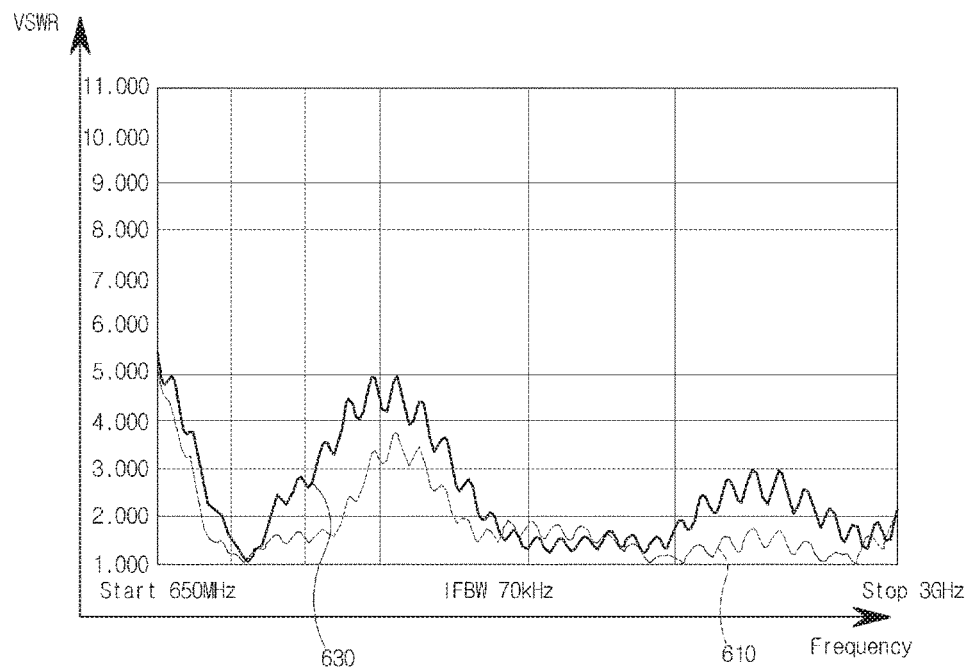

[Fig. 8]
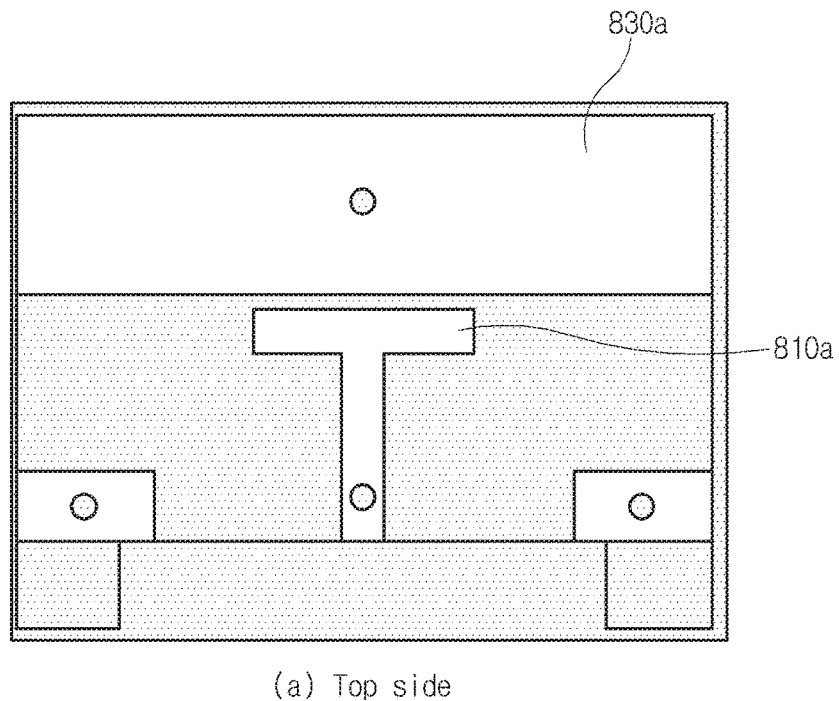
(a) Top side
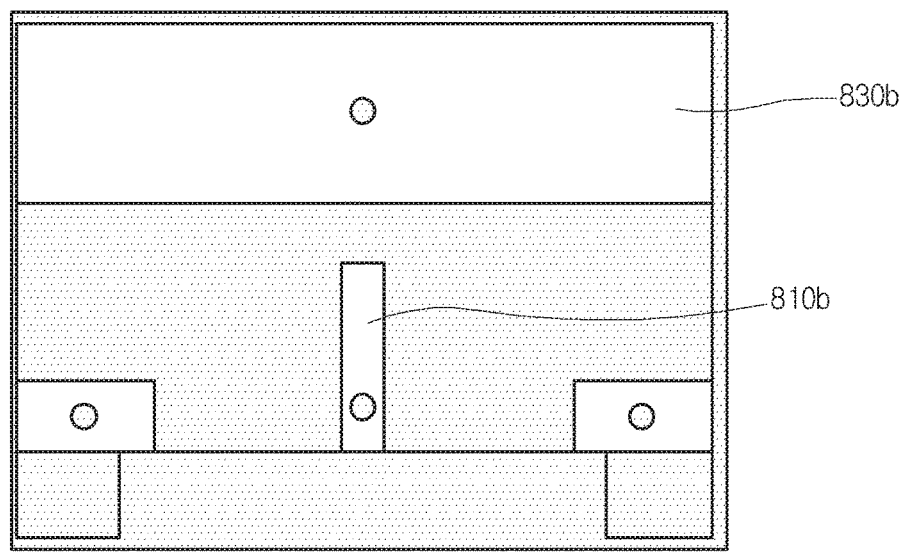
(b) Bottom side

[Fig. 9]
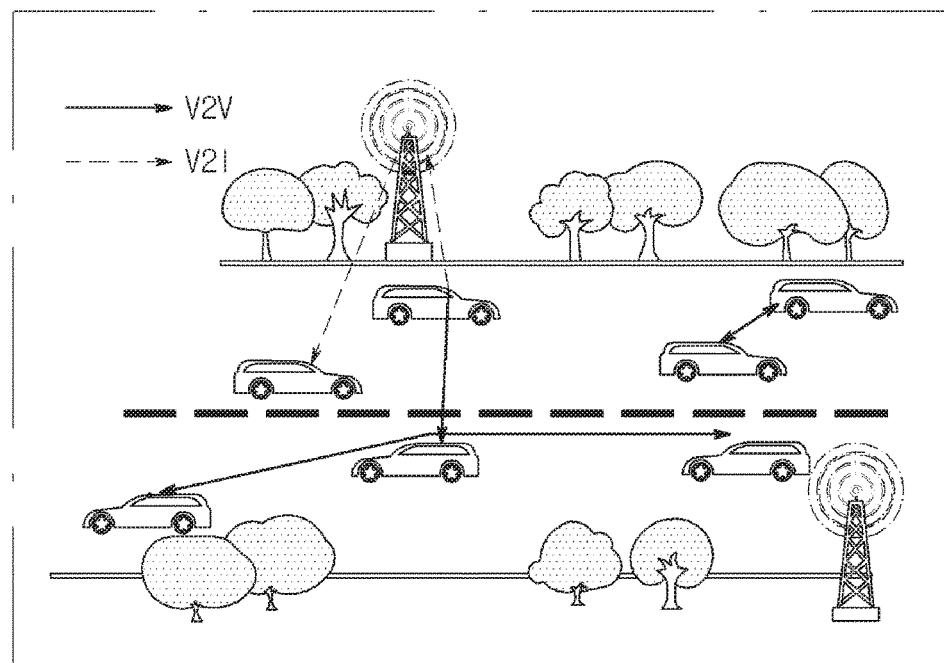
[Fig. 10]
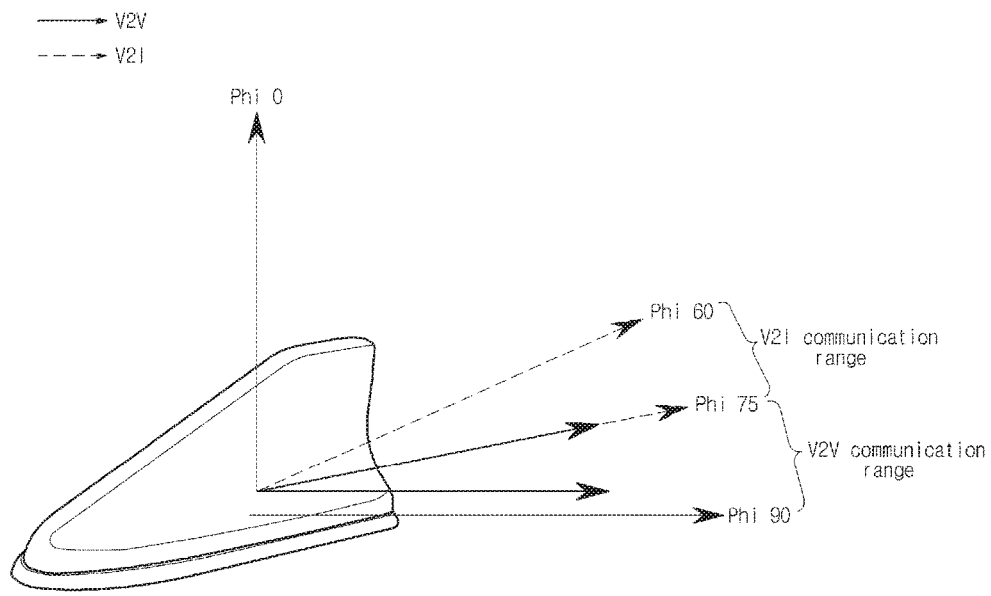

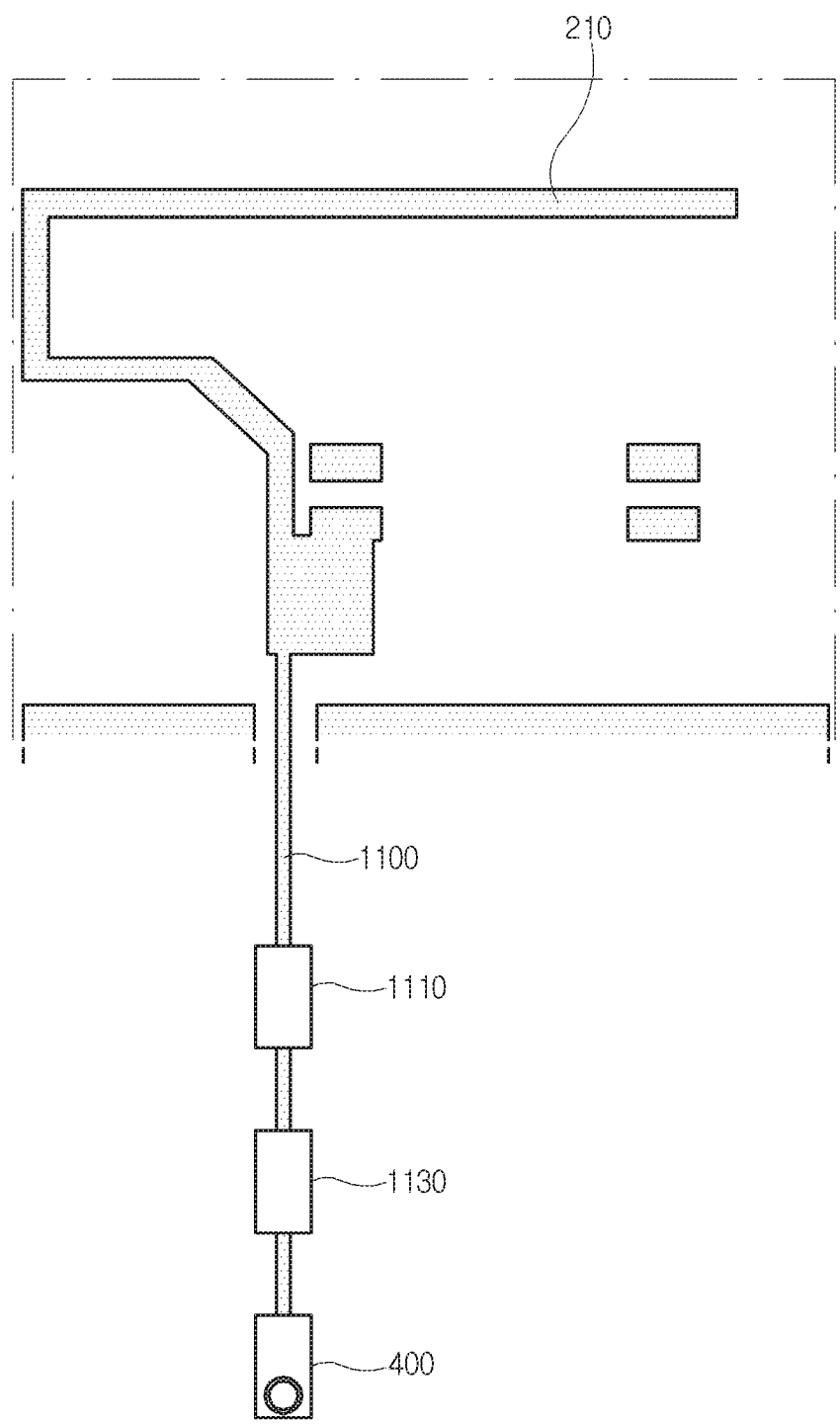
[Fig. 11]

BROADBAND ANTENNA IN THE CRASH PAD FOR VEHICLE

CROSS-REFERENCE TO RELATED APPLICATIONS

This application claims priority to Korean Patent Application No. 10-2016-0067483, filed on May 31, 2016, the disclosure of which is incorporated herein by reference in its entirety.

BACKGROUND OF THE INVENTION

Field of the Invention

Exemplary embodiments of the present invention relate to a vehicle broadband antenna, and more particularly, to a vehicle broadband antenna that is an antenna for LTE & V2X installed in the vicinity of a vehicle crash pad.

Description of the Related Art

With the development of information and communication, the concept of intelligent transportation systems (hereinafter, referred to as "ITSs") was already introduced in the 1990s for the road section and the concept of ubiquitous was also introduced in the 2000s for the road section, with the consequence that the ITSs have further progressed. These ITSs are generally aimed at realizing rapid, safe, and pleasant next-generation traffic systems suitable for information societies that are increasingly accelerated.

ITS services are classified into advanced traffic management systems (ATMSs), advanced traveler information systems (ATISs), advanced public transportation systems (APTSs), commercial vehicle operations (CVOs), and advanced vehicle and highway systems (AVHSs).

The ATMSs include an automated fare collection system, an automatic enforcement system, etc., the ATISs include a driver information system, an optimal route guidance system, etc., the APTSs include a public transportation information system, a public transportation management system, etc., the CVOs include a universal pass system, a commercial vehicle management system, etc., and the AVHSs include a rear-end prevention system, a balloon tire warning system, etc.

As described above, vehicle-to-vehicle (V2V) communication and vehicle-to-infrastructure (V2I) communication are essential for the ITSs having various services, and various types of information are transmitted and received in the vehicle therethrough. The V2I communication is a communication method for providing road traffic services through roadside base stations.

Accordingly, in the V2V communication and the V2I communication for provision of ITS services, transmission and reception are performed in a 5.8 GHz frequency band, and it has been required to develop small antennas having improved reception performance for use in WAVE (Wireless Access in Vehicular Environment) environments in recent years.

In recent years, an inverted-L antenna (ILA) is mainly used for a mobile phone. The ILA has a structure that combines a vertical antenna such as a monopole with a horizontal antenna attached to the tip of the monopole. The ILA is an antenna that may be manufactured to have a low height since the frequency characteristic of the ILA is determined by the horizontal antenna rather than the vertical antenna. In addition, the ILA is an antenna that generally has a horizontal wavelength of $\lambda/4$ and a smaller band characteristic than the typical monopole antenna, and is mostly used for mobile and portable wireless devices.

The ILA, as a multiband antenna that satisfies three GSM 900 (880 to 960 MHz), DCS 1800 (1710 to 1880 MHz), and WCDMA (1920 to 2170 MHz) bands, represents satisfactory performance in the DCS 1800 and WCDMA bands. However, the ILA has a disadvantage of narrowband characteristics and may not obtain a satisfactory voltage standing wave ratio (VSWR) in the low GSM 900 band. Meanwhile, an antenna is reconstituted to be suitable when frequencies are changed due to the interference in the vicinity of the antenna according to the mounting position thereof. However, since the antenna line of the ILA is formed by injection molding, it is necessary to manufacture an additional mold to thus cause an increase in development cost, and it may take a long time to manufacture the mold.

The conventional vehicle antenna includes a glass antenna and a roof antenna. The glass antenna is a typical radio antenna that is installed on the rear window glass of the vehicle, and the roof antenna is an antenna that is installed on the roof of the vehicle to have a very large decisive directionality.

Accordingly, when a broadband antenna is intended to be added to the conventional antenna, it is difficult to add the broadband antenna thereto due to a small space of the existing rear window or roof.

SUMMARY OF THE INVENTION

An object of the present invention is to provide a broadband antenna that can be installed in the vicinity of a crash pad instead of the installation position of an existing antenna and can be applied to vehicle wireless environments to provide convenience and safety for drivers.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a crash pad broadband antenna is installed in the vicinity of a vehicle crash pad and includes a main PCB (Printed Circuit Board), an LTE low-band antenna pattern formed on the main PCB to transmit and receive an LTE low-band signal, a first sub-PCB having LTE high-band antenna patterns configured to transmit and receive an LTE high-band signal, the first sub-PCB being vertically coupled to the main PCB, and a first terminal connected to an external communication module for transmitting and receiving the signals to/from the LTE low-band antenna pattern and the LTE high-band antenna patterns. The crash pad broadband antenna may further include a "L"-shaped copper plate connected to a removed portion of the LTE low-band antenna pattern to increase antenna passive efficiency.

The first sub-PCB may include the LTE high-band antenna patterns configured to transmit and receive the LTE high-band signal, parasitic patches positioned on the LTE high-band antenna patterns to adjust characteristics of a radio wave radiation pattern, a first connection portion configured to support the copper plate, a second connection portion allowing the first sub-PCB to be vertically erected on the main PCB, and a third connection portion connected to the main PCB to connect the LTE high-band antenna patterns to the first terminal. The LTE high-band antenna patterns may include a pattern for receiving an LTE signal in a 1170 to 2170 MHz band and a pattern for receiving an LTE signal in a 2170 to 2690 MHz band. Each of the LTE high-band antenna patterns may have a length of 3.6 mm to 4.7 mm, and each of the parasitic patches may have a length of 4.6 mm to 9.9 mm. The LTE high-band antenna patterns may have the same shape on top and bottom sides of the first sub-PCB, and the LTE high-band antenna pattern on the top side and the LTE high-band antenna pattern on the bottom side may be symmetrically formed about a central axis of the first sub-PCB. The parasitic patches may have a through-hole, the parasitic patches may have the same shape on top and bottom sides of the first sub-PCB, the parasitic patch on the top side and the parasitic patch on the bottom side may be symmetrically formed about a central axis of the first sub-PCB, and the parasitic patches on the top and bottom sides may be electrically connected to each other through the through-hole.

The crash pad broadband antenna may further include an open stuff formed in a pattern form on a side opposite to the side of the main PCB having the LTE low-band antenna pattern and connected to the ground, and a second sub-PCB having at least one of antenna patterns for V2X communication, WiFi communication, and WiBro communication, the second sub-PCB being vertically coupled to the main PCB.

The second sub-PCB may include a main pattern configured to transmit and receive a signal, and a second parasitic patch configured to adjust a form of a radio wave radiated from the main pattern.

The main PCB may include a microstrip line connecting the main pattern to an output terminal, a DTC (Diagnostic Trouble Code) circuit providing a self-diagnosis code to check whether the main pattern is connected to the communication module, and an impedance matching circuit configured to adjust impedance matching of the main pattern, and/or a microstrip line connecting at least one of the LTE high-band and low-band antenna patterns to an output terminal, a DTC circuit providing a self-diagnosis code to check whether at least one of the LTE high-band and low-band antenna patterns is connected to the communication module, and an impedance matching circuit configured to adjust impedance matching of at least one of the LTE high-band and low-band antenna patterns.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view illustrating a configuration of a crash pad broadband antenna for a vehicle according to an embodiment of the present invention;

FIG. 2 is a view illustrating a PCB pattern of an LTE low-band antenna according to the embodiment of the present invention;

FIG. 3 is a view illustrating a state in which an open stuff is added to the PCB pattern of FIG. 2 using the ground;

FIG. 4 is a graph comparing a voltage standing wave ratio (VSWR) when the open stuff is added to the PCB pattern of the LTE low-band antenna with a VSWR when it is not added thereto;

FIGS. 5 and 6 are views illustrating examples of a first sub-PCB having LTE high-band antenna patterns according to the embodiment of the present invention;

FIG. 7 is a graph illustrating a VSWR when a copper plate 500 is added to the crash pad broadband antenna according to the embodiment of the present invention;

FIG. 8 is a view illustrating a second sub-PCB 600 having an antenna pattern for V2X communication according to the embodiment of the present invention;

FIG. 9 is a view illustrating an example of communication according to the method of WAVE communication;

FIG. 10 is a view illustrating an optimized radiation pattern angle in V2I and V2X communication regions; and FIG. 11 is a view illustrating a microstrip line 1100 that connects an antenna pattern and a first terminal 400 according to the embodiment of the present invention.

DESCRIPTION OF SPECIFIC EMBODIMENTS

Exemplary embodiments of the present invention will be described below in more detail with reference to the accompanying drawings so as to be realized by a person of ordinary skill in the art. The present invention may, however, be embodied in different forms and should not be construed as limited to the embodiments set forth herein.

In certain embodiments, the description irrelevant to the present invention may be omitted to avoid obscuring appreciation of the disclosure. Throughout the disclosure, like reference numerals refer to like parts throughout the various figures and embodiments of the present invention.

In the whole description, it will be understood that when an element is referred to as being "connected" to another element, it can be "directly connected" to the other element or it can be "electrically connected" to the other element with other elements being interposed therebetween. In addition, it will be understood that when a component is referred to as being "comprising" any component, it does not exclude other components, but can further comprises the other components unless otherwise specified.

It will be understood that when an element is referred to as being "above" another element, it can be immediately above the other element or intervening elements may also be present. In contrast, when an element is referred to as being "immediately above" another element, there are no intervening elements present.

Although terms such as first, second, and third are used to describe various parts, components, regions, layers, and/or sections, the present invention is not limited thereto. Such terms will be used only to differentiate one part, component, region, layer, or section from other parts, components, regions, layers, or sections. Accordingly, a first part, component, region, layer, or section may be referred to as a second part, component, region, layer, or section without deviating from the scope and spirit of the present invention.

The terminology used in the specification of the present invention is for the purpose of describing particular embodiments only and is not intended to limit the invention. As used in the specification and the appended claims, the singular forms are intended to include the plural forms as well, unless context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, and/or components thereof.

Spatially-relative terms such as "below", "above", or the like may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" other elements would then be oriented "above" the other elements. The exemplary terms "below" can, therefore, encompass both an orientation of above and below. Since the device may be oriented in another direction such as rotation of 90° or another angle, the spatially-relative terms may be interpreted in accordance with the orientation of the device.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the exemplary embodiments of the present invention will be described in more detail with reference to the accompanying drawings so as to be realized by a person of ordinary skill in the art.

FIG. 1 is a view illustrating a configuration of a crash pad broadband antenna for a vehicle according to an embodiment of the present invention.

A crash pad as an internal component is mounted to the front in a vehicle to relieve shocks. A broadband antenna may not have a high height as an existing roof antenna or shark antenna in order to be positioned in the vicinity of the crash pad. In order to resolve the constraint, the crash pad broadband antenna for a vehicle according to the embodiment of the present invention may be an inverted-L antenna (ILA) that is installed on a PCB (Printed Circuit Board).

Referring to FIG. 1, the crash pad broadband antenna for a vehicle according to the embodiment of the present invention may include a main PCB 100, an LTE low-band antenna pattern 200 that is formed on the main PCB 100 to receive an LTE low-band signal, a first sub-PCB 300 that has LTE high-band antenna patterns and is vertically coupled to the main PCB 100, and a first terminal 400 that outputs a signal received in the antenna to transmits the signal to a communication module and receives a signal from the communication module to emit a current to the antenna. Here, the LTE low-band antenna pattern 200 formed on the main PCB 100 may include a connection part 250 for connection with the LTE high-band antenna patterns included in the first sub-PCB 300, and the LTE low-band and high-band antenna patterns may be connected to the first terminal 400 by a microstrip line 1100. Thus, the electric power received in the antenna may be transmitted to the first terminal 400 without attenuation. The detailed description thereof will be given later.

In addition, the crash pad broadband antenna may further include a copper plate 500 to increase the passive efficiency of the LTE antenna, and a second sub-PCB 600 that has an antenna pattern for V2X communication, WiFi communication, or WiBro communication and is vertically coupled to the main PCB 100. In this case, the crash pad broadband antenna may further include a second terminal 700 that transmits a signal received from the antenna pattern for V2X communication, WiFi communication, or WiBro communication included in the second sub-PCB 600.

Nowadays, there is a need for an antenna that may receive frequencies in 703 to 960, 1710 to 2170, 2300 to 2400, and 2500 to 2690 MHz bands for support of LTE communication used domestically. In order for the crash pad broadband antenna for a vehicle according to the embodiment of the present invention to support all bands for LTE communication and be adapted for mass production, the crash pad broadband antenna may include the LTE low-band antenna pattern formed on the main PCB 100 and the LTE high-band antenna patterns formed on the separate PCB (first sub-PCB 300). Here, the LTE low-band may be a 704 to 960 MHz band, and the LTE high-band may be a 1710 to 2690 MHz band.

FIG. 2 is a view illustrating a PCB pattern including the LTE low-band antenna pattern according to the embodiment of the present invention.

Referring to FIG. 2, the LTE low-band antenna pattern may be formed on a top side (a surface on which sub-PCBs and other parts are mounted) of the main PCB 100. The signals transmitted from the communication module (not shown) through the microstrip line 1100 may be transmitted from a rectangular pattern 220 through the LTE low-band antenna pattern 200 or the connection part 250 to the LTE high-band antenna patterns included in the first sub-PCB 300, or conversely the signal received in the LTE high-band antenna patterns and the signal received in the LTE low-band antenna pattern 200 may be combined in the rectangular pattern 220 and be transmitted to the communication module through the microstrip line 1100. Here, it is possible to adjust a receivable frequency according to the length of the end 210 of the LTE low-band antenna pattern. The length of the end may be an at least about 35 mm, and the LTE low-band antenna pattern may include an open stuff, which will be described later, to adjust a receivable frequency. Since conventional antennas for LTE are manufactured using molds, it is necessary to manufacture new molds to adjust frequencies. However, it is difficult to take quick response to products since it takes at least a month to manufacture the products using new molds. In contrast, the present invention can have a secondary effect in terms of quick response since the antenna is manufactured using the PCB pattern in a very short time.

In addition, the open stuff may be added to the LTE low-band antenna pattern.

FIG. 3 is a view illustrating a state in which the open stuff is added to the PCB pattern of FIG. 2 using the ground.

Referring to FIG. 3, the open stuff may consist of two open stuffs, one 310 of which is added to the end of the LTE low-band antenna pattern on the top side of the main PCB 100, and the other 330 of which is added to the ground on a bottom side of the main PCB 100 (a side opposite to the top side of the main PCB). It is possible to improve the bandwidth and gain of the antenna by the addition of the open stuffs.

FIG. 4 is a graph comparing a voltage standing wave ratio (VSWR) when the open stuff is added to the PCB pattern of the LTE low-band antenna with a VSWR when it is not added thereto.

The VSWR refers to a ratio between the maximum value and the minimum value of a voltage standing wave amplitude generated by the sum of a voltage wave proceeding from a transmission line to a load and a voltage wave reflected from the load, and is typically used to represent a level of impedance matching in a place between an antenna and a power supply line. The value of the VSWR is used as an amount indicative of how well a transmission line characteristic impedance is matched with an end load antenna impedance, and the VSWR has a value of 1 when the impedances are matched with each other. It is practically regarded that the impedances are matched with each other when the VSWR has a typical value of 4 or less.

Referring to FIG. 4, when comparing a VSWR 410 when the open stuff is present is compared with a VSWR 420 when no open stuff is present, they are similar in the LTE low-frequency (704 to 960 MHz) band, whereas the VSWR when the open stuff is present is lower than that when no open stuff is present in the LTE high-frequency (1710 to 2690 MHz) band. Therefore, it can be seen that the receivable bandwidth of the antenna and thus the gain thereof are increased.

FIGS. 5 and 6 are views illustrating examples of the first sub-PCB having the LTE high-band antenna patterns according to the embodiment of the present invention.

Referring to FIGS. 5 and 6, the crash pad broadband antenna further includes the first sub-PCB 300 to improve a gain for the LTE high band. The first sub-PCB 300 may include LTE high-band antenna patterns 510a and 510b or 510c and 510d for transmitting and receiving an LTE high-band signal, parasitic patches 560a and 560b or 560c and 560d for further improving broadband characteristics, first connection portions 520a and 520b that are connected to the copper plate 500 to increase antenna passive efficiency, second connection portions 531a, 531b, 533a, and 533b that allow the first sub-PCB 300 to be erected on the main PCB 100, and a third connection portion 540 that is connected to the connection part 250 on the main PCB 100 in order to connect the LTE high-band antenna patterns 510a and 510b or 510c and 510d to the first terminal 400 for transmitting and receiving signals to and from the first terminal 400 provided in the main PCB 100. Here, the LTE high-band antenna patterns 510a and 510b or 510c and 510d may have the same shape on the top and bottom sides of the first sub-PCB, and the LTE high-band antenna pattern 510a or 510c on the top side and the LTE high-band antenna pattern 510b or 510d on the bottom side may be symmetrically formed about the central axis of the first sub-PCB. The parasitic patches 560a and 560b or 560c and 560d may have the same shape on the top and bottom sides of the first sub-PCB, and the parasitic patch 560a or 560c on the top side and the parasitic patch 560b or 560d on the bottom side may be symmetrically formed about the central axis of the first sub-PCB. In addition, the parasitic patches 560a and 560b or 560c and 560d on the top and bottom sides may have a through-hole 570a or 570b so as to be electrically connected to each other. The broad antenna may have different frequency characteristics by the influence of ambient metals when it is installed to the dashboards of various vehicles. Therefore, each of the LTE high-band antenna patterns 510a and 510b or 510c and 510d may be designed to have a length of 3.6 mm to 4.7 mm, and each of the parasitic patches 560a and 560b or 560c and 560d may be designed to have a length of 4.6 mm to 9.9 mm.

Referring to FIG. 1 again, the crash pad broadband antenna may further include the copper plate 500 to receive signals in a wider frequency band. The copper plate 500 has a "L" shape. The copper plate 500 may be configured such that one end thereof is positioned on a portion formed by removing an intermediate point of the LTE low-band antenna pattern and is connected to the LTE low-band antenna pattern, and the other end thereof is connected to the first sub-PCB 300 having the LTE high-band antenna patterns.

FIG. 7 is a graph illustrating a VSWR when the copper plate 500 is added to the crash pad broadband antenna according to the embodiment of the present invention.

Referring to FIG. 7, it can be seen that a VSWR 610 when the copper plate 500 is present is lower than a VSWR 630 when no copper plate is present in almost all frequency bands. Particularly, it can be seen that the VSWR 610 has a value of 2 or less in the LTE frequency (704 to 960 MHz and 1710 to 2690 MHz) bands. That is, it can be seen that the supportable bandwidth of the LTE antenna when the copper plate 500 is added thereto is wider than that when the copper plate is not added thereto, as illustrated in FIG. 7.

Referring to FIG. 1 again, the second sub-PCB 600, which has the antenna pattern for V2X communication, WiFi communication, or WiBro communication, may be is vertically coupled and connected to the main PCB 100. Although the second sub-PCB 600 having the antenna pattern for V2X communication is illustratively described later, the present invention may be applied to the second sub-PCB having the antenna pattern for WiFi communication or WiBro communication.

FIG. 8 is a view illustrating the second sub-PCB 600 having the antenna pattern for V2X communication according to the embodiment of the present invention.

Since the above-mentioned LTE antenna pattern is made of an FR4 material having nonuniform dielectric characteristics for each raw material point, the efficiency of the LTE antenna may be reduced as frequencies are increased. Hence, the antenna may not have good characteristics if the antenna pattern is made of an FR4 material. Accordingly, the antenna pattern is made of a Teflon material for V2X communication used in a higher frequency (5850 to 5925 MHz) band than the LTE frequency (maximum 2690 MHz) band. When the antenna pattern is made of a Teflon material, the antenna can have a uniform dielectric constant and it is possible to increase the efficiency of the antenna by minimizing a loss tangent (a ratio between dielectric loss and reactive power in an insulation system).

Referring to FIG. 8, the second sub-PCB 600 includes main patterns 810a and 810b for transmitting and receiving signals, and parasitic patches 830a and 830b that adjust the form of radio waves radiated from the antenna to maximize the efficiency of vehicle-to-vehicle (V2V) communication.

FIG. 9 is a view illustrating an example of communication according to the method of WAVE communication.

FIG. 10 is a view illustrating an optimized radiation pattern angle in V2I and V2X communication regions.

Referring to FIG. 9, since the V2V communication is a communication method in which a vehicle communicates with another vehicle placed on the almost same plane, rather than a base station placed at a high position as in the conventional LTE communication, the radio wave patterns radiated from the antenna must proceed parallel to the road in order to increase reception efficiency in the vehicle. That is, in the WAVE communication, a radiation pattern optimized for the vehicle antenna is required for V2I and V2V communication. Referring to FIG. 10, the radiation pattern has an angle of 75° to 90° in the V2V communication region and an angle of 75° to 60° in the V2I communication region. Accordingly, there is a need for an antenna that may cover a radiation pattern angle of 30° to 90° for smooth V2I and V2V communication.

Accordingly, it is possible to adjust the radiation pattern as the radio wave radiated from the antenna by means of using parameters such as the sizes of the parasitic patches 830a and 830b and the distances between the parasitic patches 830a and 830b and the main patterns 810a and 810b.

That is, the parasitic patches 830a and 830b may be positioned above the main patterns 810a and 810b so that the radiated radio wave pattern is more concentrated downward. Thus, the radio wave pattern may proceed parallel to the road.

The following Table 1 represents the signal strength of the antenna measured at the angles illustrated in FIG. 10 when the parasitic patches 830a and 830b are added to the second sub-PCB 600 for V2X communication and when they are not added thereto. In Table 1, the unit of each value is dBi. The dBi is used as decibel (dB) that represents a size of a radiation pattern of a specific antenna relative to an isotropic antenna.

TABLE 1

| Frequency | Presence of Parasitic Patch | | | No Parasitic Patch | | |
|---|---|---|---|---|---|---|
| (MHz) | 60° | 75° | 90° | 60° | 75° | 90° |
| 5,850 | 1.59 | 0.93 | −0.59 | 0.17 | −0.37 | −1.79 |
| 5,890 | 1.34 | 0.64 | −0.85 | −0.14 | −0.77 | −2.13 |
| 5,925 | 2.32 | 1.64 | 0.07 | 1.28 | 0.75 | −0.59 |

As in the above Table 1, it can be seen that the antenna has a larger gain at an angle of 60° to 90° in the V2I and V2V communication when the parasitic patches are present.

FIG. 11 is a view illustrating the microstrip line 1100 that connects the antenna pattern and the first terminal 400 according to the embodiment of the present invention.

It is important to efficiently arrange lines in a space of a low-frequency circuit board without a need to consider frequency characteristics. The reason is because production costs are considerably affected by how short the same number of lines are arranged in a narrow space. In this case, the position of the ground is not important and there is no need to consider the distance between the ground and the signal line. However, the lines must be arranged to be suitable for frequency characteristics in a high-frequency circuit board. The microstrip line is a high-frequency circuit that is designed to satisfy frequency characteristics and conditions in the high-frequency circuit board. The microstrip line as a typical transmission line is a circuit configured such that a whole base is grounded using a single metal plate, a dielectric substrate having a certain thickness is positioned immediately on the base, and a line is formed on the dielectric substrate. Through such a structure, the distance and medium characteristic between the signal line and the ground are uniform, and signals are preserved and transmitted between the line and the ground by electromagnetic field energy. Accordingly, the microstrip line has an important characteristic that always uniformly fixes the medium condition between the line and the ground, compared to a typical circuit. Thus, it is possible to transmit LTE signals corresponding to high frequencies without attenuation using the microstrip line 1100.

Although FIG. 11 illustrates connection with the LTE antenna, the present invention may be applied to connection with the main patterns 810a and 810b of the second sub-PCB 600.

Referring to FIG. 11, the antenna pattern may be connected to the first terminal 400 by the microstrip line 1100, and thus the electric power received from the antenna may be transmitted to the first terminal 400 without attenuation. The microstrip line 1100 may be provided, at a portion thereof, with a DTC (Diagnostic Trouble Code) circuit 1130 that is connected to the first terminal 400 and provides self-diagnosis codes to check whether the antenna is normally connected to the communication module for treating the signals received from the antenna, and an impedance matching circuit 1110 for adjusting the impedance matching of the antenna.

In order to easily mount the crash pad broadband antenna for a vehicle according to the embodiment of the present invention to the crash pad, the main PCB 100 may have a size of 135×55×1t, and the first sub-PCB may have a size of 30×13×1.6t.

According to the present invention, it is possible to resolve the space limitations of the conventional roof antenna and to adjust the radiation pattern of the antenna so as to be suitable for vehicle-to-vehicle (V2V) communication and vehicle-to-infrastructure (V2I) communication as V2X communication. In addition, it is possible to realize the LTE broadband antenna that obtains a high gain in the broad band using the open stuff and the copper plate.

As is apparent from the above description, it is possible to overcome existing spatial limitations by applying a broadband antenna to a vehicle and to efficiently constitute the antenna.

In addition, it is possible to significantly reduce the time required to manufacture and develop an existing mold.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A crash pad broadband antenna, which is installed in the vicinity of a vehicle crash pad, comprising:
   a main PCB (Printed Circuit Board);
   an LTE low-band antenna pattern formed on the main PCB in an inverted-L form to transmit and receive an LTE low-band signal;
   a first sub-PCB having LTE high-band antenna patterns configured to transmit and receive an LTE high-band signal, the first sub-PCB being vertically coupled to the main PCB; and
   a first terminal connected to an external communication module for transmitting and receiving the signals to/from the LTE low-band antenna pattern and the LTE high-band antenna patterns.

2. The crash pad broadband antenna according to claim 1, further comprising a "L"-shaped copper plate connected to a removed portion of the LTE low-band antenna pattern to increase antenna passive efficiency.

3. The crash pad broadband antenna according to claim 2, the first sub-PCB comprises:
   the LTE high-band antenna patterns configured to transmit and receive the LTE high-band signal;
   parasitic patches positioned on the LTE high-band antenna patterns to adjust characteristics of a radio wave radiation pattern;
   a first connection portion configured to support the copper plate;
   a second connection portion allowing the first sub-PCB to be vertically erected on the main PCB; and a third connection portion connected to the main PCB to connect the LTE high-band antenna patterns to the first terminal.

4. The crash pad broadband antenna according to claim 3, wherein the LTE high-band antenna patterns comprise a pattern for receiving an LTE signal in a 1170 to 2170 MHz band and a pattern for receiving an LTE signal in a 2170 to 2690 MHz band.

5. The crash pad broadband antenna according to claim 3, wherein each of the LTE high-band antenna patterns has a length of 3.6 mm to 4.7 mm, and each of the parasitic patches has a length of 4.6 mm to 9.9 mm.

6. The crash pad broadband antenna according to claim 3, wherein the LTE high-band antenna patterns have the same shape on top and bottom sides of the first sub-PCB, and the LTE high-band antenna pattern on the top side and the LTE high-band antenna pattern on the bottom side are symmetrically formed about a central axis of the first sub-PCB.

7. The crash pad broadband antenna according to claim 3, wherein:
   the parasitic patches have a through-hole; and
   the parasitic patches have the same shape on top and bottom sides of the first sub-PCB, the parasitic patch on the top side and the parasitic patch on the bottom side are symmetrically formed about a central axis of the first sub-PCB, and the parasitic patches on the top and bottom sides are electrically connected to each other through the through-hole.

8. The crash pad broadband antenna according to claim 1, further comprising an open stuff formed in a pattern form on a side opposite to the side of the main PCB having the LTE low-band antenna pattern and connected to the ground.

9. The crash pad broadband antenna according to claim 1, further comprising:
   a second sub-PCB having at least one of antenna patterns for V2X communication, WiFi communication, and WiBro communication, the second sub-PCB being vertically coupled to the main PCB; and
   a second terminal configured to output a signal received from the antenna pattern formed in the second sub-PCB.

10. The crash pad broadband antenna according to claim 9, wherein the second sub-PCB comprises:
    a main pattern configured to transmit and receive a signal; and
    a second parasitic patch configured to adjust a form of a radio wave radiated from the main pattern.

11. The crash pad broadband antenna according to claim 10, wherein the main PCB comprises:
    a microstrip line connecting the main pattern to the second terminal;
    a DTC (Diagnostic Trouble Code) circuit providing a self-diagnosis code to check whether the main pattern is connected to the communication module; and
    an impedance matching circuit configured to adjust impedance matching of the main pattern.

12. The crash pad broadband antenna according to claim 1, wherein the main PCB comprises:
    a microstrip line connecting at least one of the LTE high-band and low-band antenna patterns to the first terminal;
    a DTC circuit providing a self-diagnosis code to check whether at least one of the LTE high-band and low-band antenna patterns is connected to the communication module; and
    an impedance matching circuit configured to adjust impedance matching of at least one of the LTE high-band and low-band antenna patterns.

* * * * *